United States Patent
DeLaet

(10) Patent No.: US 9,539,509 B2
(45) Date of Patent: *Jan. 10, 2017

(54) SYSTEM AND METHOD FOR DYNAMICALLY ALTERING AN IN-GAME EXPERIENCE BASED ON A USER'S CONNECTION TO THE GAME

(71) Applicant: KABAM, INC., San Francisco, CA (US)

(72) Inventor: Michael C. DeLaet, Foster City, CA (US)

(73) Assignee: Kabam, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/923,270

(22) Filed: Oct. 26, 2015

(65) Prior Publication Data

US 2016/0038835 A1 Feb. 11, 2016

Related U.S. Application Data

(63) Continuation of application No. 14/062,788, filed on Oct. 24, 2013, now Pat. No. 9,168,459.

(51) Int. Cl.
| | | |
|---|---|---|
| A63F 13/12 | (2006.01) | |
| A63F 13/358 | (2014.01) | |
| A63F 13/30 | (2014.01) | |
| H04L 12/26 | (2006.01) | |
| A63F 13/80 | (2014.01) | |

(52) U.S. Cl.
CPC .......... *A63F 13/358* (2014.09); *A63F 13/12* (2013.01); *A63F 13/80* (2014.09); *H04L 43/0811* (2013.01)

(58) Field of Classification Search
CPC ........ A63F 13/358; A63F 13/30; A63F 13/12; H04L 43/0811
See application file for complete search history.

(56) References Cited

U.S. PATENT DOCUMENTS

| | | |
|---|---|---|
| 8,257,177 B1 | 9/2012 | Saund |
| 8,366,554 B1 | 2/2013 | Yuan |
| 9,168,459 B1 | 10/2015 | DeLaet |
| 2003/0031062 A1 | 2/2003 | Tsurugai |
| 2006/0079329 A1 | 4/2006 | Yamada |
| 2007/0294387 A1 | 12/2007 | Martin |
| 2008/0146338 A1 | 6/2008 | Bernard et al. |
| 2011/0263332 A1 | 10/2011 | Mizrachi |

*Primary Examiner* — Corbett B Coburn
(74) *Attorney, Agent, or Firm* — Sheppard Mullin Richter & Hampton LLP

(57) ABSTRACT

Dynamically altering an in-game experience based on a user's connection to the online game. The online game may monitor connection strength of a device of the user to a network via which the user may access the online game. The online game may dynamically alter the user's experience based on the connection strength of the device. The online game may make available or remove the availability of one or more modes of game play to the user based on the connection strength of the user's device.

20 Claims, 2 Drawing Sheets

US 9,539,509 B2

SYSTEM AND METHOD FOR DYNAMICALLY ALTERING AN IN-GAME EXPERIENCE BASED ON A USER'S CONNECTION TO THE GAME

FIELD

The disclosure relates to dynamically altering an in-game experience based on a user's connection to the online game.

BACKGROUND

Various techniques for altering an in-game experience of an online game for a user are known. For example, a game may allow a user to switch between a user versus user mode to a user versus environment mode during game play. In another example, the functionality of a game may be limited based on a type of device (e.g., mobile device or computer) used by the user to play the online game. In some examples, the availability of a location-based gaming mode may be made based on the type of device used by the user to play the online game. Conventional systems, however, may fail to dynamically alter an in-game experience of a user based on the user's connection type and/or connection strength while playing the online game. Conventional systems suffer from these and other drawbacks.

SUMMARY

One aspect of the disclosure relates to dynamically altering an in-game experience based on a user's connection to the online game. The online game may monitor connection strength of a device of the user to a network via which the user may access the online game. The online game may dynamically alter the user's experience based on the connection strength of the device. The online game may make available or remove the availability of one or more modes of game play to the user based on the connection strength of the user's device.

A system configured to facilitate dynamically altering an in-game experience based on a user's connection to the online game may include one or more processors configured to execute compute program modules. The program modules may comprise a game module, connection strength module, a game mode module, and/or other modules.

The game module may be configured to execute an instance of a game space. The game module may be configured to facilitate presentation of views of the game space to one or more users. The game module may be configured to facilitate interaction of the one or more users with the game space and/or each other by performing operations in the game space in response to commands received from the one or more users.

The connection strength module may be configured to determine connection strength of a device of a user to a network.

The game mode module may be configured to alter availability of one or more game modes to the user responsive to a change in the determined connection strength. The one or more game modes may comprise, for example, user-versus-user mode, user versus-environment mode, and/or other modes.

A computer-implemented method of dynamically altering an in-game experience based on a user's connection to the online game may be implemented on a computer system that includes one or more physical processors. The method may comprise: executing a game instance of a game space; facilitating presentation of views of the game space to one or more users; facilitating interaction of the one or more users with the game space and/or each other by performing operations in the game space in response to commands received from the one or more users, wherein the one or more users comprises a first user; determining connection strength of a device of the user to a network; and altering availability of one or more game modes to the user responsive to a change in the determined connection strength, wherein the one or more game modes comprise: user-versus-user mode or user versus-environment mode.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
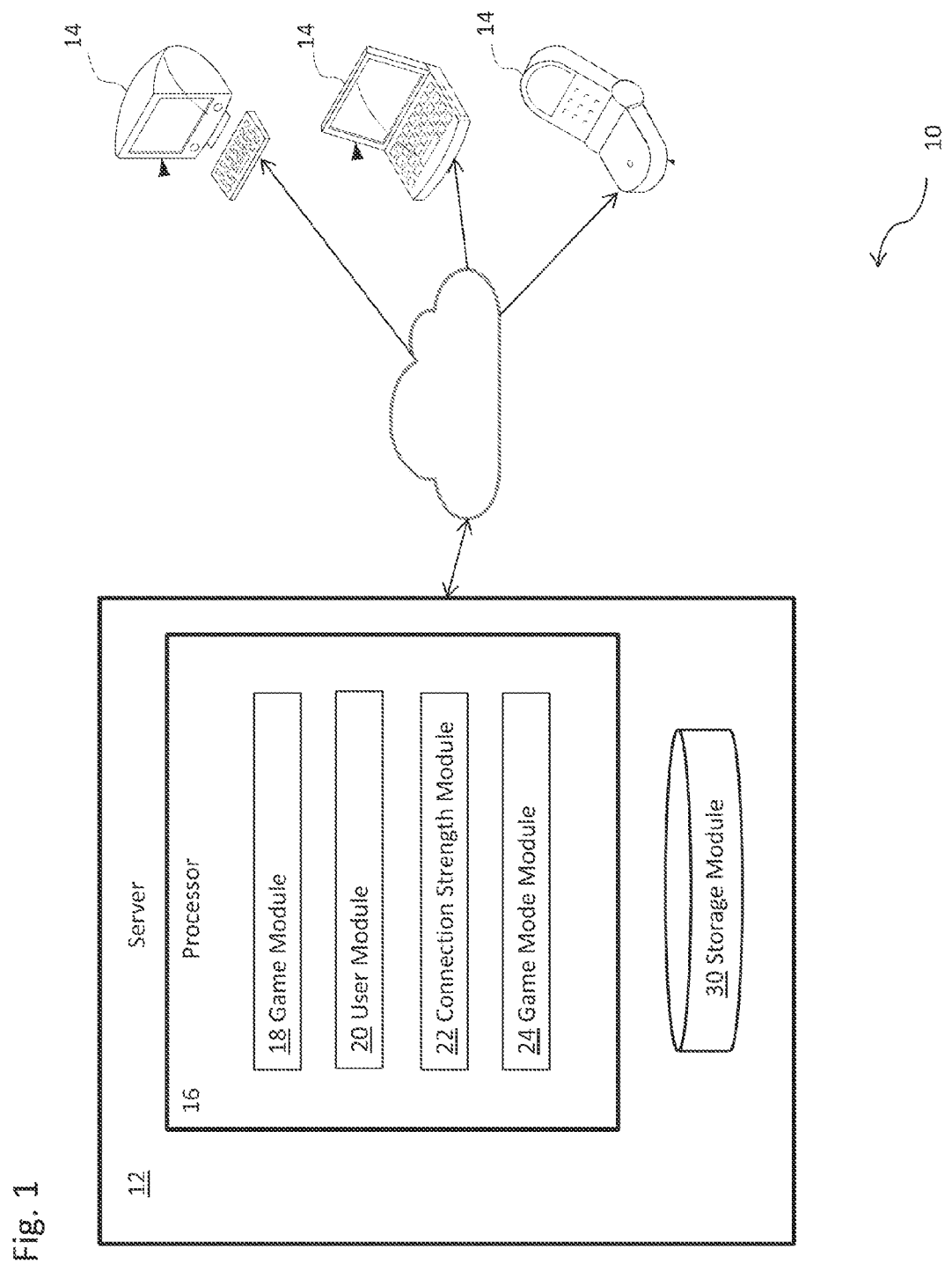
FIG. 1 illustrates an exemplary system of dynamically altering an in-game experience based on a user's connection to the online game, according to an aspect of the invention.

FIG. 1 provides an exemplary illustration of a system 10 configured to facilitate dynamically altering an in-game experience based on a user's connection to the online game, according to various aspects of the invention. In some implementations, system 10 may include a server 12. The server 12 may be configured to communicate with one or more client computing platforms 14 according to a client/server architecture. The users may access system 10 and/or the virtual space via client computing platforms 14.

The server 12 may be configured to execute one or more computer program modules. The computer program modules may include one or more of a game module 18, a user module 20, a connection strength module 22, a game mode module 24, and/or other modules.

The game module 18 may be configured to execute an instance of a game space. In some implementations, the game space may be a virtual space. As such, a game space may be an instance of the virtual space. A space module may be configured to implement the instance of the virtual space executed by the computer modules to determine state of the virtual space. The state may then be communicated (e.g., via streaming visual data, via object/position data, and/or other state information) from server 12 to client computing platforms 14 for presentation to users. The state determined and transmitted to a given client computing platform 14 may correspond to a view for a user character being controlled by and/or associated with a user via the given client computing platform 14. The state determined and transmitted to a given client computing platform 14 may correspond to a location in the virtual space. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the virtual space may comprise a simulated space that is accessible by users via clients (e.g., client computing platforms 14) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The instance of the virtual space and/or the game that takes place therein may be persistent. That is, the virtual space and/or the game may continue on whether or not individual players are currently logged in and/or participating in the game. A player that logs out of the virtual space and then logs back in some time later may find the virtual space has been changed through the interactions of other players with the virtual space during the time the player was logged out. These changes may include changes to the simulated physical space, changes in the player's inventory, changes in other player's inventories, changes experienced by non-player characters, and/or other changes.

The above description of the manner in which state of the virtual space is determined by space module is not intended to be limiting. The space module may be configured to express the virtual space in a more limited, or richer, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space module, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user.

The users may participate in the instance of the virtual space by controlling one or more of the available user controlled elements in the virtual space. Control may be exercised through control inputs and/or commands input by the users through client computing platforms 14. The users may interact with each other through communications exchanged within the virtual space. Such communications may include one or more of textual chat, instant messages, private messages, voice communications, and/or other communications. Communications may be received and entered by the users via their respective client computing platforms 14. Communications may be routed to and from the appropriate users through server 12 (e.g., through game module 18).

The user module 20 may be configured to access and/or manage one or more user accounts and/or user information associated with users of the system 10. The one or more user accounts and/or user information may include information stored by server 12, one or more of the client computing platforms 14, and/or other storage locations. The user accounts may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), information related to an inventory of virtual units, virtual structures, virtual currency, virtual items, and/or other virtual assets of users, virtual space usage information, demographic information associated with users, interaction history among users in the virtual space, information stated by users, purchase information of users, browsing history of users, a client computing platform identification associated with a user, a phone number associated with a user, and/or other information related to users.

The user accounts may include at least a first user account for a first user. The first user account may comprise, for example, information related to an inventory of one or more virtual units under the control of and/or associated with the first user, one or more virtual structures under the control of and/or associated with the first user, and/or other virtual assets of the first user.

The connection strength module 22 may be configured to determine connection strength of a device of a user to a network. The connection strength module 22 may be configured to determine connection strength of the device to the network via which the user accesses the online game. For example, the connection strength module 22 may read a received signal strength indication (RSSI) of the device. The RSSI of the device may indicate connection strength of the device to the network.

The connection strength module 22 may measure the RSSI in dBms and/or any other suitable measure. A dBm may be a power ratio in decibels of the measured power of the connection in reference to one milliwatt (mW). A measure of dBms may be used, for example, in radio, microwave, fiber optics, and/or other communication methods. A measure of dBm may indicate connection strength on an absolute scale.

The connection strength module 22 may detect a RSSI of the device via an application protocol interface (API) of the online game. The API may be downloaded as part of the game, available for download via the game (e.g., as an extra feature), and/or may otherwise be accessible via the online game. In some implementations, the connection strength module 22 may detect whether an API exists on the device via which the connection strength module 22 may detect RSSI of the device. In some implementations, the connection strength module 22 may detect whether another application or functionality exists on the device via which the connection strength module 22 may detect the RSSI of the device. The connection strength module 22 may store each detected RSSI of the device in the non-transitory electronic storage media 30. In some implementations, the connection strength module 22 may store a detected RSSI of the device, a time stamp at which the RSSI was determined, and/or other information related to the connection strength of the device. The connection strength module 22 may store the information related to the connection strength of the device each time the connection strength is determined, at predetermined time periods, once every predetermined number of times the connection strength is determined, and/or at other times.

The connection strength module 22 may detect RSSI of the device on a periodic basis. For example, the connection strength module 22 may detect RSSI every predetermined time period, responsive to a condition occurring in the game, responsive to a change to a user's interaction with the game, and/or based on other changes that may occur relative to the game. A condition that may occur in the game may comprise, for example, loading of the game, loss of the game by the user, loading of a new level in the game, increasing a level of game play in the game, downloading of a new version of the game, saving game information to a backup repository on the network, and/or other condition that may occur in the game. A change in the user's interaction with the game may comprise, for example, a predetermined interaction between the user and the game, obtaining a new skill by a user, obtaining a new virtual asset, and/or other change that affects the user's game play.

The game mode module 24 may be configured to alter availability of one or more game modes to the user responsive to a change in the determined connection strength. The one or more game modes may comprise, for example, user-versus-user mode, user versus-environment mode, and/or other modes. The game mode module 24 may alter availability of a game mode responsive to a change in a determined connection strength relative to, for example, a threshold connection strength.

In some implementations, the non-transitory electronic storage media 30 may store the threshold connection strength. In some implementations, the threshold connection strength may be set by game administrators, may be pre-set and unchangeable, may be changed by a user of the online game, may be changed by the online game, and/or may otherwise be determined. For example, an initial threshold connection strength may be set by a game administrator and may be the threshold connection strength available upon download of the game. The initial threshold connection strength may comprise, for example a value within a range of 78-82 dBms. In some implementations, the initial threshold connection strength is 80 dBm. In some implementations, the initial threshold connection strength may not be changed.

In some implementations, the connection strength module 22 is configured to determine a latency of a user action in the online game. For example, the connection strength module 22 may determine latency of a user action based on a response time until a response is presented through the views of the game space to the user. The connection strength module 22 may store information related to the determined connection strength during the user action. Responsive to one or more conditions occurring, the connection strength module 22 may determine whether the determined connection strength associated with the user action is less than a threshold connection strength. The conditions may comprise, for example, the latency exceeding a predetermined threshold, the latency being outside a normal range of latencies, and/or another condition related to an abnormal latency value. Responsive to the determined connection strength being less than the threshold connection strength, the connection strength module 22 may change the threshold connection strength to be the determined connection strength.

In some implementations, the connection strength module 22 may determine a new threshold connection strength based on the values of the stored connection strengths of the device of the user to the network from the non-transitory electronic storage media. The values of the stored connection strengths may comprise, for example, all stored values, the most recent predetermined number of values (based on time stamps stored with the values), a random sampling of a predetermined number of values, and/or other set of values of the stored connection strengths. For example, the connection strength module 22 may determine a new threshold connection strength based on an average of the values of the stored connection strengths. In another example, the connection strength module 22 may determine a threshold connection strength based on a determination of a standard deviation of the stored connection strengths. In another example, the connection strength module 22 may determine a threshold connection strength based a rank of the connection strengths, where the connection strengths may be ordered based on value. In another example, the connection strength module 22 may determine a threshold connection strength based on a value of a connection strength at a predetermined percentile rank, where the connection strengths may be ordered based on value. In some implementations, the connection strength module 22 may query the user of the device to input information related to a calculation to apply to the stored connection strengths to determine a threshold connection strength. The connection strength module 22 may determine a threshold connection strength based on other calculations related to the stored connection strengths as well, and is not limited to the examples described herein.

Responsive to calculating a threshold connection strength, the connection strength module 22 may change the threshold connection strength stored in the non-transitory storage media 30 to be the calculated threshold connection strength.

In some implementations, upon download of a new version of the online game, the threshold connection strength may be changed. For example, a value of the threshold connection strength may be included in the data downloaded with the new version of the online game.

In some implementations, a user may manually change the threshold connection strength. For example, a user may access settings of the online game to change the threshold connection strength.

The game mode module 24 may be configured to alter the availability of the one or more game modes responsive to the determined connection strength changing from being equal to or greater than the threshold connection strength to being less than the threshold connection strength. The game modes may include, for example, a user-versus-user mode, a user-versus-environment mode, and/or other game modes.

In some implementations, the game mode module 24 may also be configured to increase the emphasis of one or more features related to an available game mode in the online game in the views of the game space presented to the user responsive to another game mode becoming unavailable based on the change in the determined connection strength. For example, the game mode module 24 may increase brightness, make color more vibrant, add effects, and/or otherwise provide emphasis to one or more features related to an available game mode in the online game in the views of the presented game space.

In some implementations, the game mode module 24 may de-emphasize one or more features related to an unavailable game mode in the online game in the views of the game space presented to the user responsive to another game mode becoming unavailable based on the change in the determined connection strength. For example, the game mode module 24 may gray out, remove, remove input capabilities from, and/or otherwise de-emphasize one or more features of the online game related to an unavailable game mode.

The game mode module 24 may be configured to alter the availability of one or more game modes by automatically changing from one game mode to another game mode responsive to a determined connection strength exceeding and/or falling below the threshold connection strength. For example, the game mode module 24 may automatically change from a user-versus-user mode to a user-versus environment mode responsive to the determined threshold connection strength changing from being equal to or greater than the threshold connection strength to being less than the threshold connection strength. In another example, the game mode module 24 may automatically make available a user-versus-user mode along with a user-versus environment mode responsive to the determined threshold connection strength changing from being less than the threshold connection strength to being equal to or greater than the threshold connection strength.

In some implementations, the game mode module 24 may be configured to notify the user responsive a change in determined connection strength relative to the threshold connection strength. For example, the game mode module 24 may be configured to notify the user responsive to the determined connection strength changing from below the threshold connection strength to equal to or greater than the threshold connection strength. In some implementations, the game mode module 24 may automatically make available a user-versus-user mode responsive to the increase in connection strength. In some implementations, the game mode module 24 may only notify the user responsive to the determined connection strength being equal to or above threshold connection strength for a predetermined amount of time. The predetermined amount of time may be set by administrators of the online game, may be pre-set with the online game, may be set by the user, may be determined based on calculations related to the stored connection strengths in the non-transitory electronic storage media 30, and/or may be otherwise determined.

In some implementations, the game mode module 24 may receive input from the user responsive to notifying the user of the change in connection strength relative to the threshold connection strength. The game mode module 24 may be configured to alter the available of the game modes by making available the user versus user mode responsive to receiving the input from the user.

In some implementations, the game mode module 24 may be configured to notify a user of a potential change in availability of game modes. For example, responsive to the connection strength decreasing a predetermined amount in a predetermined amount of time, the game mode module 22 may be configured to notify that user that a game mode (e.g., user versus user game mode) may not be available, although the current determined connection strength may be equal to or above the threshold connection strength. In some implementations, the notification that a game mode may not be available may comprise one or more of: an amount of time before the game mode may not be available, an estimated number of plays that may be made by the user in the game mode before the game mode may not be available, and/or other information related to the availability of the game mode. The predetermined amount of time may be set by administrators of the online game, may be pre-set with the online game, may be set by the user, may be determined based on calculations related to the stored connection strengths in the non-transitory electronic storage media 30, and/or may be otherwise determined.

In some implementations, the server 12, client computing platforms 14, and/or other components of the system 10 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 12, client computing platforms 14, and/or other components of the system 10 may be operatively linked via some other communication media.

A given client computing platform 14 may include one or more processors configured to execute computer program modules. The computer program modules may be configured to enable an expert or user associated with the given client computing platform 14 to interface with system 10 and/or other components of the system 10, and/or provide other functionality attributed herein to client computing platforms 14. By way of non-limiting example, the given client computing platform 14 may include one or more of a desktop computer, a laptop computer, a handheld computer, a tablet computing platform, a NetBook, a Smartphone, a gaming console, and/or other computing platforms.

The server 12 may include electronic storage 30, one or more processors 16, and/or other components. The server 12 may include communication lines, or ports to enable the exchange of information with a network and/or other computing platforms. Illustration of server 12 in FIG. 1 is not intended to be limiting. The server 12 may include a plurality of hardware, software, and/or firmware components operating together to provide the functionality attributed herein to server 12. For example, server 12 may be implemented by a cloud of computing platforms operating together as server 12.

Electronic storage 30 may comprise electronic storage media that electronically stores information. The electronic storage media of electronic storage 30 may include one or both of system storage that is provided integrally (i.e., substantially non-removable) with server 12 and/or removable storage that is removably connectable to server 12 via, for example, a port (e.g., a USB port, a FireWire port, etc.) or a drive (e.g., a disk drive, etc.). Electronic storage 30 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 30 may include one or more virtual storage resources (e.g., cloud storage, a virtual private network, and/or other virtual storage resources). Electronic storage 30 may store software algorithms, information determined by processor 16, information received from server 12, information received from client computing platforms 14 and/or other information that enables server 12 to function as described herein.

Processor(s) 16 is configured to provide information processing capabilities in server 12. As such, processor 16 may include one or more of a digital processor, an analog processor, a digital circuit designed to process information, an analog circuit designed to process information, a state machine, and/or other mechanisms for electronically processing information. Although processor 16 is shown in FIG. 1 as a single entity, this is for illustrative purposes only. In some implementations, processor 16 may include a plurality of processing units. These processing units may be physically located within the same device, or processor 16 may represent processing functionality of a plurality of devices operating in coordination. The processor 16 may be configured to execute modules 18, 20, 22, 24, and/or other modules. Processor 16 may be configured to execute modules 18, 20, 22, 24, and/or other modules by software; hardware; firmware; some combination of software, hardware, and/or firmware; and/or other mechanisms for configuring processing capabilities on processor 16.

It should be appreciated that although modules 18, 20, 22, 24, and/or other modules are illustrated in FIG. 1 as being co-located within a single processing unit, in implementations in which processor 16 includes multiple processing units, one or more of modules 18, 20, 22, 24, and/or other modules may be located remotely from the other modules. The description of the functionality provided by the different modules 18, 20, 22, 24, and/or other modules described below is for illustrative purposes, and is not intended to be limiting, as any of modules 18, 20, 22, 24, and/or other modules may provide more or less functionality than is described. For example, one or more of modules 18, 20, 22, 24, and/or other modules may be eliminated, and some or all of its functionality may be provided by other ones of modules 18, 20, 22, 24, and/or other modules. As another example, processor 16 may be configured to execute one or more additional modules that may perform some or all of the functionality attributed below to one of modules 18, 20, 22, 24, and/or other modules.

Figure 2:
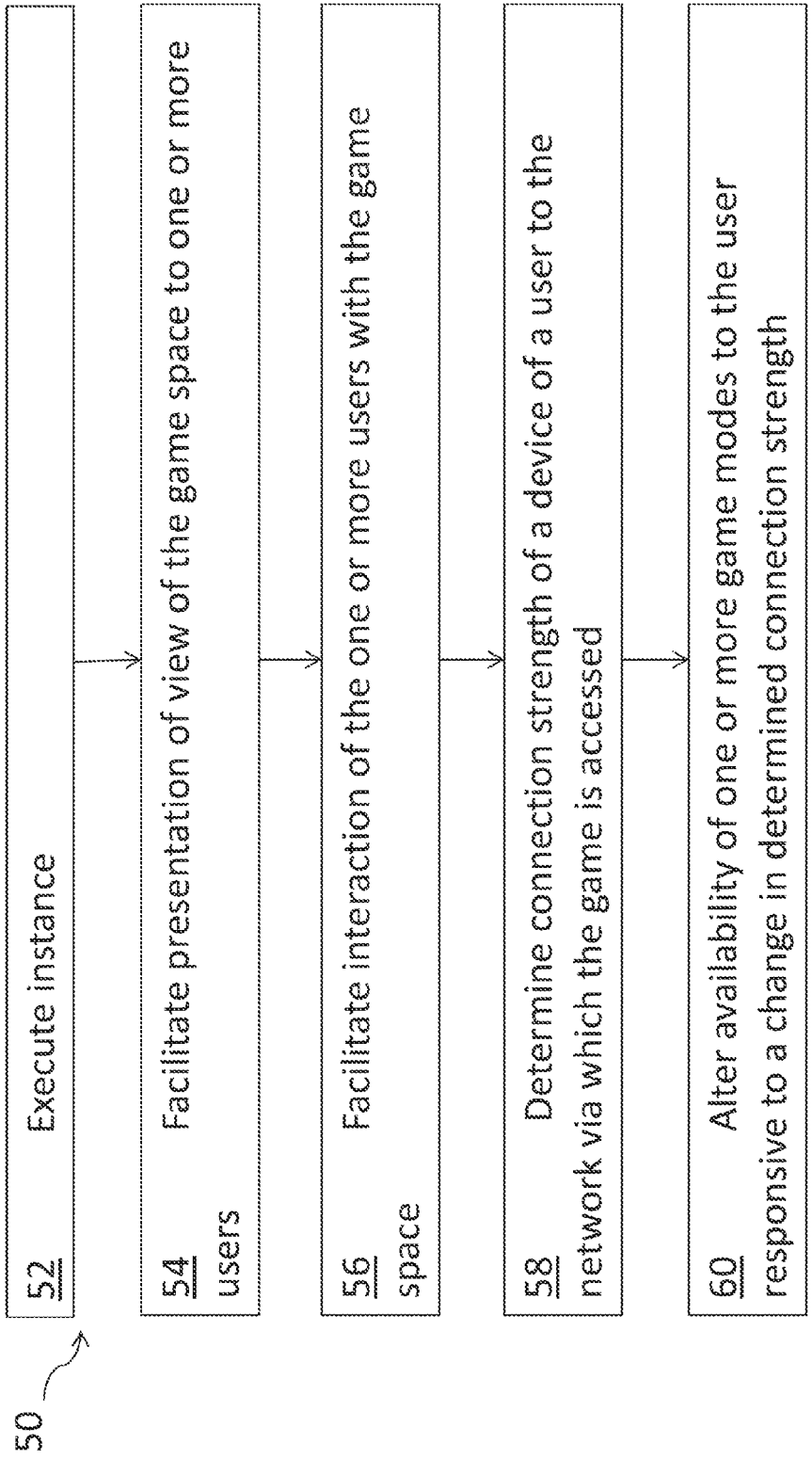
FIG. 2 illustrates an exemplary method of dynamically altering an in-game experience based on a user's connection to the online game, according to an aspect of the invention.

FIG. 2 illustrates a method 50 of dynamically altering an in-game experience based on a user's connection to the online game, according to various aspects of the invention. The operations of method 50 presented below are intended to be illustrative. In some embodiments, method 50 may be accomplished with one or more additional operations not described, and/or without one or more of the operations discussed. Additionally, the order in which the operations of method 50 are illustrated in FIG. 2 and described below is not intended to be limiting.

In some embodiments, method 50 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 50 in response to instructions stored electronically on an electronic storage medium. The one or more processing devices may include one or more devices configured through hardware, firmware, and/or software to be specifically designed for execution of one or more of the operations of method 50.

At an operation 52, an instance of a virtual space may be executed. In some implementations, operation 52 may be performed by a game module the same as or similar to game module 18 (shown in FIG. 1 and described above).

At an operation 54, views of the game space may be presented to one or more users. The views may be presented to users via client computing platforms. In some implementations, operation 54 may be performed by a game module the same as or similar to game module 18 (shown in FIG. 1 and described above).

At an operation 56, interaction of the one or more users with the game space and/or each other may be facilitated by performing operations in the game space in response to commands received from the one or more users. In some implementations, operation 56 may be performed by a game module the same as or similar to game module 18 (shown in FIG. 1 and described herein) and/or a battle module the same as or similar to game module 28 (shown in FIG. 1 and described herein).

At operation 58, a connection strength of a device of the user to a network may be determined. In some implementations, operation 58 may be performed by a connection strength module the same as or similar to connection strength module 22 (shown in FIG. 1 and described herein).

At an operation 60, availability of one or more game modes to the user may be altered responsive to a change in the determined connection strength, wherein the one or more game modes comprise: user-versus-user mode or user versus-environment mode. In some implementations, operation 60 may be performed by a game mode module the same as or similar to game mode module 24 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for dynamically altering an in-game experience based on a user's connection to the online game, the system comprising:
   one or more processors configured by machine-readable instructions to:
   execute a game instance of a game space, and to facilitate presentation of views of the game space to one or more users, and to facilitate interaction of the one or more users with the game space and/or each other by performing operations in the game space in response to commands received from the one or more users and wherein the one or more users comprises a first user;
   determine a connection strength of a device of the user to a network, wherein responsive to the device of the user having at least a first connection strength, there are multiple game modes available to the user; and
   alter availability of one or more of the multiple game modes to the user responsive to a decrease in the determined connection strength such that at least one of the multiple game modes becomes unavailable.

2. The system of claim 1, wherein the one or more processors are further configured by machine-readable instructions to
store a threshold connection strength; and
alter the availability of the one or more game modes responsive to the determined connection strength changing from being equal to or greater than the threshold connection strength to being less than the threshold connection strength.

3. The system of claim 2, wherein the one or more processors are configured by machine-readable instructions to:
increase emphasis of one or more features related to an available game mode in the online game in the views of the game space presented to the one or more users responsive to another game mode becoming unavailable based on the decrease in the determined connection strength.

4. The system of claim 3, wherein the one or more processors are configured by machine-readable instructions to alter availability of the one or more game modes by:
automatically changing game modes responsive to the determined threshold connection strength changing from being equal to or greater than the threshold connection strength to being less than the threshold connection strength.

5. The system of claim 3, wherein the one or more processors are configured by machine-readable instructions to:
notify the user responsive to the determined connection strength changing from below the threshold connection strength to equal to or greater than the threshold connection strength.

6. The system of claim 5, wherein the one or more processors are configured by machine-readable instructions to:
alter the availability of the one or more game modes responsive to receiving input from the user based on the received notification that the determined connection strength is equal to or greater than the threshold connection strength.

7. The system of claim 5, wherein the one or more processors are configured by machine-readable instructions to notify the user responsive to the determined connection strength being equal to or above threshold connection strength for a predetermined amount of time.

8. The system of claim 5, wherein the determined connection strength is equal to or above the threshold connection strength, and wherein the one or more processors are configured by machine-readable instructions to notify the user that at least one of the one or more game modes may not be available responsive to connection strength decreasing a predetermined amount in a predetermined amount of time.

9. The system of claim 8, wherein the notification that at least one of the one or more game modes may not be available comprises one or more of: an amount of time before game mode changed, or an estimated number of plays that may be made by the user in the present game mode before the present game mode may not be available.

10. The system of claim 2, wherein the one or more processors are configured by machine-readable instructions to:
determine latency of a user action in the online game based on response time until a response is presented through the views of the game space to the user;
store information related to the determined connection strength during the user action;
responsive to one or more of: the latency exceeding a predetermined threshold, or the latency being outside a normal range of latencies, determine whether the determined connection strength associated with the user action is less than the threshold connection strength; and
responsive to the determined connection strength being less than the threshold connection strength, change the threshold connection strength to be the determined connection strength.

11. A computer-implemented method of dynamically altering an in-game experience based on a user's connection to the online game, the method being implemented on a computer system that includes one or more physical processors configured by machine-readable instructions, the method comprising:
executing a game instance of a game space;
facilitating presentation of views of the game space to one or more users;
facilitating interaction of the one or more users with the game space and/or each other by performing operations in the game space in response to commands received from the one or more users, wherein the one or more users comprises a first user;
determining a connection strength of a device of the user to a network, wherein responsive to the device of the user having at least a first connection strength, there are multiple game modes available to the user; and
altering availability of one or more of the multiple game modes to the user responsive to a decrease in the determined connection strength such that at least one of the multiple game modes becomes unavailable.

12. The method of claim 11, further comprising:
storing a threshold connection strength,
wherein altering the availability of the one or more game modes comprises:
altering the availability of the one or more game modes responsive to the determined connection strength changing from being equal to or greater than the threshold connection strength to being less than the threshold connection strength.

13. The method of claim 12, further comprising:
increasing emphasis of one or more features related to an available game mode in the online game in the views of the game space presented to the one or more users responsive to another game mode becoming unavailable based on the decrease in the determined connection strength.

14. The method of claim 13, wherein altering availability of the one or more game modes comprises:
automatically changing game modes responsive to the determined threshold connection strength changing from being equal to or greater than the threshold connection strength to being less than the threshold connection strength.

15. The method of claim 13, further comprising:
notifying the user responsive to the determined connection strength changing from below the threshold connection strength to equal to or greater than the threshold connection strength.

16. The method of claim 15, further comprising:
altering the availability of the one or more game modes responsive to receiving input from the user based on the received notification that the determined connection strength is equal to or greater than the threshold connection strength.

17. The method of claim 15, further comprising:

notifying the user responsive to the determined connection strength being equal to or above threshold connection strength for a predetermined amount of time.

18. The method of claim 15, wherein the determined connection strength is equal to or above the threshold connection strength, wherein the method further comprises:

notifying the user that at least one of the one or more game modes may not be available responsive to connection strength decreasing a predetermined amount in a predetermined amount of time.

19. The method of claim 18, wherein the notification that at least one of the one or more game modes may not be available comprises one or more of: an amount of time before game mode changed, or an estimated number of plays that may be made by the user in the present game mode before the game mode may not be available.

20. The method of claim 12, further comprising:

determining latency of a user action in the online game based on response time until a response is presented through the views of the game space to the user;

storing information related to the determined connection strength during the user action;

responsive to one or more of: the latency exceeding a predetermined threshold, or the latency being outside a normal range of latencies, determining whether the determined connection strength associated with the user action is less than the threshold connection strength; and responsive to the determined connection strength being less than the threshold connection strength, changing the threshold connection strength to be the determined connection strength.

* * * * *